Patented Dec. 1, 1931

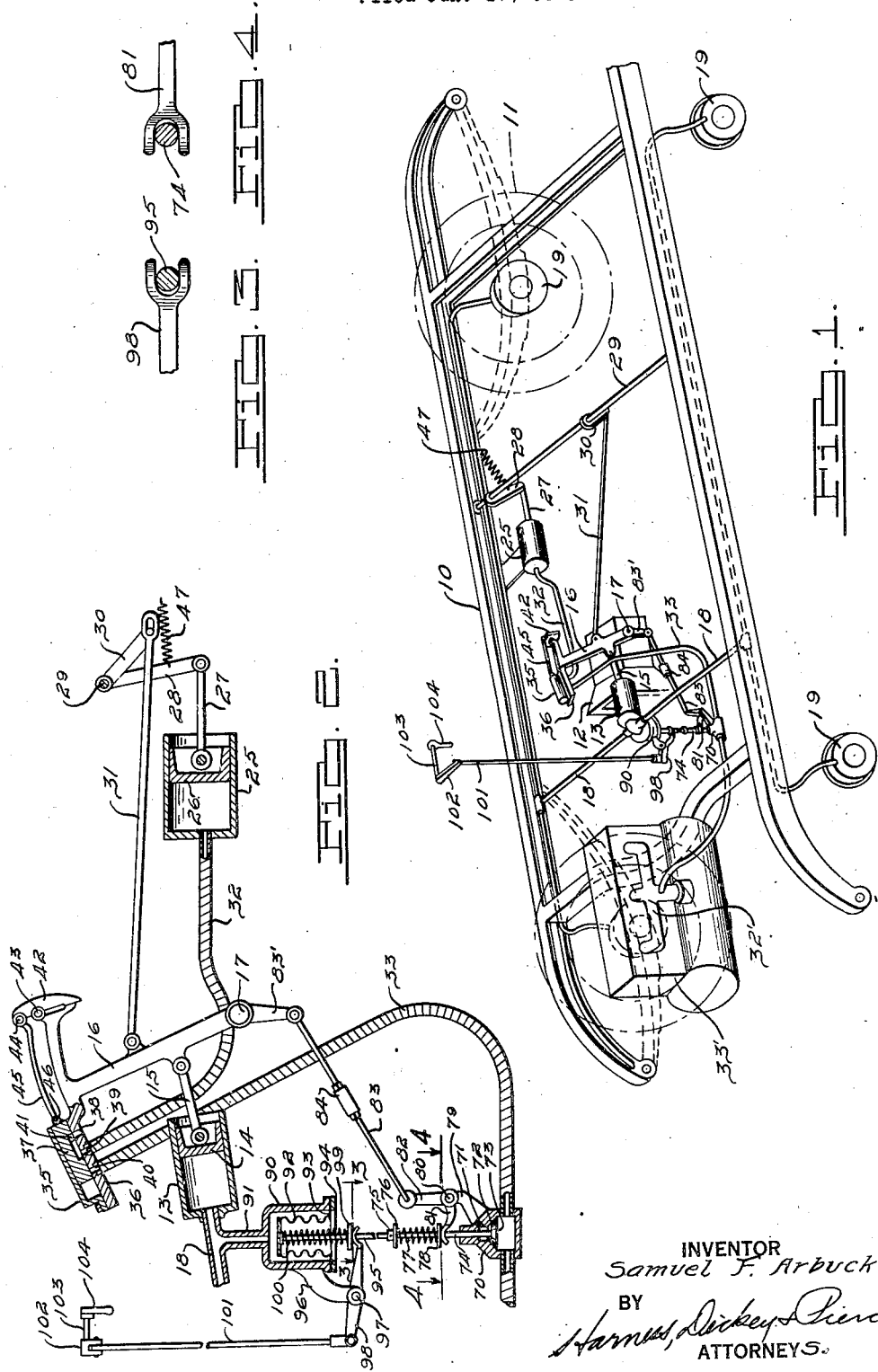

1,834,368

UNITED STATES PATENT OFFICE

SAMUEL F. ARBUCKLE, OF HIGHLAND PARK, MICHIGAN, ASSIGNOR TO S. F. ARBUCKLE CORP., A CORPORATION OF DELAWARE

BRAKE MECHANISM

Application filed June 17, 1929. Serial No. 371,452.

This invention relates to brake mechanism and particularly to such mechanism as employs suction actuated means for aiding in the application of the brakes, and is an improvement on the construction shown and described in the application of myself and Andrew L. Vargha for Letters Patent of the United States for improvements in braking mechanism, filed April 2, 1928, Serial No. 266,551.

The principal object of the present invention is to provide a device of the type described for use in connection with braking systems of the so-called hydraulic type.

Another object is to provide a suction actuated booster mechanism for hydraulically actuated brakes in which the degree of braking effort may be easily and accurately controlled.

Another object is to provide a booster mechanism for fluid pressure motor vehicle braking systems in which manually controlled means are provided convenient to the operator of the vehicle for definitely limiting to a predetermined amount the braking action that the booster mechanism may impose upon the vehicle.

Another object is to provide in combination with a hydraulic braking system, a booster mechanism in which the amount of force applied by the booster mechanism may be controlled through suitable operation of the brake pedal.

A further object is to provide, in combination with a hydraulic braking system, means controlled by suitable operation of the brake operating pedal for varying the amount of braking pressure which the booster mechanism may exert upon the braking system, and cooperating manually controllable means for modifying the action of the first mentioned means.

The above being among the objects of the present invention, the same consists in certain novel features of construction and combination of parts to be hereinafter described with reference to the accompanying drawings and then claimed, having the above and other objects in view.

In the accompanying drawings which illustrate suitable embodiments of the present invention, and in which like numerals refer to like parts throughout the several different views, Fig. 1 is a more or less diagrammatic perspective view of a portion of an automobile chassis showing the application of the present invention thereto.

Fig. 2 is a more or less diagrammatic vertical sectional view of the booster mechanism shown in Fig. 1.

Fig. 3 is a horizontal section taken on line 3—3 of Fig. 2.

Fig. 4 is a horizontal section taken on line 4—4 of Fig. 2.

Referring to the accompanying drawings I show in Figure 1 in a more or less diagrammatic manner the preferred arrangement of the present invention with respect to a hydraulic braking system for a motor vehicle. In this figure 10 represents a conventional motor vehicle chassis frame which is provided with the usual wheels 11. Mounted upon the engine transmission housing 12 is a cylinder 13, usually known as the master cylinder, in which is received a piston 14, which is connected by a link 15 to the brake pedal 16 suitably mounted as on the shaft 17 for oscillating movement. The master cylinder 13, which may be of any conventional design, is connected through tubes such as 18 to the brake mechanisms, indicated generally as 19, mounted for co-operation with each of the wheels 11. The brake mechanism 19 may take any of the conventional forms of mechanisms of this type. In conventional operation when it is desired to apply the brakes the foot pedal 16 is depressed, thereby moving the piston 14 in the cylinder 13 and causing the liquid therein to be forced through the tubes 18 to the various brake mechanisms 19 and there apply pressure to cause application of the brake mechanism.

It will be apparent of course that the amount of pressure that it will be possible to apply to the various brake mechanisms 19 will depend entirely upon the amount of pressure that is applied to the foot pedal 16, the diameter of the cylinder 13 and the relative distance between the shaft 17 and the point of connection of the link 15 with the pedal 16, as well as the effective length of the pedal 16. For practical reasons this pressure is necessarily limited, and where such hydraulic braking systems are applied to motor vehicles of the truck or bus type, it is usually desirable, in order to obtain the desired braking effect, to provide means for applying a greater pressure to the liquid in the braking system than is possible solely by foot pressure. Accordingly, a so-called vacuum booster mechanism may be employed to assist in the application of the brake mechanism.

This booster mechanism may take the form illustrated in Figs. 1 and 2, in which a cylinder 25 may be suitably mounted on the chassis and in which cylinder is received a piston such as 26. The piston 26 may be connected by a link such as 27 and lever arm 28 to a cross shaft such as 29 journaled at its ends on the sides of the frame of the chassis 10. The shaft 29 in turn may be connected to the pedal 16 through a lever arm such as 30 and link 31. The interior of the cylinder 25 is connected through conduits 32 and 33 to the intake manifold 32' of the internal combustion engine 33' which forms the motive power for the vehicle. A valve mechanism is inserted between the conduits 32 and 33 in order to control the application of the suction from the intake manifold to the cylinder 25.

This valve may take the form shown in Fig. 2 which comprises a housing 35 carried on an extension 36 on the foot pedal 16 in which a valve member 37 is slidably received. The extension 35 is provided with openings 38, 39 and 40 therethrough, the conduit 32 being connected with the opening 39, the conduit 33 being connected with the opening 40 and the opening 38 being connected with the atmosphere.

The valve member 37 has a recess 41 in its lower side which bridges the openings 38 and 39 so as to connect the interior of the cylinder 25 with the atmosphere when the valve is in an inoperative position. The valve 37 is controlled by a pad member 42 pivotally mounted on the foot pedal 16 at 43 and pivotally connected at 44 with a link 45 which is pivotally attached to the valve 37 at 46.

The pad 42 may be rocked about the pivot 43 independently of the movement of the foot pedal 16 to control the application of the booster mechanism through suitable movement of the valve 37. When the pad is rotated in a counter-clockwise direction from the position shown in Fig. 2, the valve member 37 is moved to an operative position in which the recess 41 bridges the openings 39 and 40 and thus connects the interior of the cylinder 25 with the source of suction. The suction, acting upon the piston 26, causes the latter to approach the closed end of the cylinder 25 and acting through the link 27, lever arm 28, shaft 29, lever arm 30 and link 31 moves the foot pedal 16 towards the brake applying position.

The braking power developed by the suction in the above manner may be augmented by manually pressing the brake pedal forwardly while the pad 42 is held in its tilted position. When the brake pedal is released and the pad 42 is rotated to its initial position shown in Fig. 2, the foot pedal is returned to its normal rearward position partially by the pressure in the system and partially by a spring 47 which is secured at one end to the frame of the chassis 10 and at its other end to the lever 28. The return movement of the pad 42 shifts the valve 37 bringing the recess 41 thereof into registration with the openings 38 and 39, thereby admitting air from the atmosphere into the cylinder 25.

In order to prevent an excessive application of the booster mechanism to the brakes, and thereby to control the amount of force exerted by the booster mechanism by the relative position of the brake pedal, the following mechanism is provided.

A small housing 70 is connected into the suction line between the cylinder 25 and inlet manifold 32'. This housing is provided with an opening 71 leading to the atmosphere, and between the opening 71 and the point of entrance of the suction tube into the housing a valve seat 72 is formed. A valve 73 is adapted to rest against the seat 72 and is provided with an upwardly extending stem 74. Adjacent its top the stem is provided with a collar 75 secured against relative axial movement to the stem and against which a washer 76 bears. A coil spring 77 encircles the stem 74 and is held under compression between the washer 76 and a second washer 78 encircling the stem 74 and axially slidable thereon. It will be apparent that the compression of this spring 77 controls the point at which the suction within the tube 33 will cause the valve 73 to open, and that when the valve 73 opens air will be drawn into the housing through the opening 71 and thereby prevent a higher degree of suction from being built up in the tube 33, and consequently will limit the suction that may be applied to the cylinder 25.

The tension of the spring 77 is controlled in the following manner. A bracket 79 is formed on the housing 70 and has pivotally connected thereto by means of the pin 80 a bell-crank having a horizontally extending arm 81 and a vertically extending arm 82. The free end of the arm 81 is provided with an upper convex face and is split so as to receive the stem 74 within it, the upper convex face serving as a stop for limiting the downward movement of the washer 78 of the valve stem 74. The free end of the vertically extending arm 82 of the bell-crank is connected by means of a rod 83 to the end of a downwardly extending arm 83' of the pedal 16. The rod 83 preferably includes a turn-buckle 84 for adjustably controlling the effective length of the member 83.

It will be apparent that by this construction the further the pedal 16 is depressed, the higher the washer 78 will be moved on the stem 74 and consequently the greater will be the compression of the spring 77, and accordingly a greater degree of suction will be permitted to be built up in the suction tube 33. Thus by suitably controlling the depression of the pedal 16 by the foot, the operator of the vehicle may control the amount of force which the booster mechanism may exert upon the vehicle brakes and, consequently, will be able to control the amount of braking action on the vehicle.

Under certain conditions and particularly with power actuated brakes, as in the present case, it is desirable that the maximum amount of braking effort in particular cases be limited to a predetermined value varying in each case. For instance, when the vehicle is being driven over icy or other slippery roads it is preferable that it be impossible to apply sufficient braking effort to lock the wheels against turning which would result in loss of steering and would foster skidding. It is preferable not to attempt to govern this maximum braking effort through the foot pedal itself for the reason that the driver of a vehicle in cases of emergency usually depresses the pedal to its fullest extent. These means should also be such as to be easily controllable by the driver of the vehicle from his normal driving position. Accordingly I have provided in the present invention means for limiting the maximum available braking effort that may be applied by the booster mechanism, and have made such means adjustable and readily controllable by the driver from his normal driving position.

Referring to Fig. 2 it will be noted that I have provided a housing 90, the interior of which is connected through the tube 91 to the interior of the tube 18 in which the fluid employed in the brake actuating mechanism is enclosed. The housing 90 is provided with an open end, through which is inserted into the housing 90 an expansible and contractable member 92, preferably of the metallic bellows type as shown. This bellows is provided with an outwardly extending flange 93 at its open end, which is clamped to the housing 90 through a clamping ring 94, and which thereby acts to seal the open end of the housing 90. The closed end of the bellows 92 is provided with a downwardly depending stem 95 which terminates in normally spaced but adjacent relationship with respect to the stem 74 of the valve 73. The housing 90 is provided with a bracket arm 96, to which is pivoted between its ends by means of pin 97 an arm 98. One end of the arm 98 is formed similarly to the end of the arm 81 previously described, that is it is forked so as to extend around the stem 95 and is provided with a convex upper face against which a washer 99 encircling the stem 95 bears. A coil spring 100 encircling the stem 95 is held under compression between the washer 99 and the closed end of the bellows 92. The other end of the arm 98 is connected by a rod 101 to an arm 102 mounted on a rotatable shaft 103, whose rotatable position is controlled by means of a hand lever 104. By suitably turning the handle 104 the arm 98 is caused to rock about the pin 97 and thereby raise or lower the washer 99 to cause a corresponding change in the compressive stresses in the spring 100.

With this construction it will be apparent that there will be two forces tending to move the stem 95 axially upon application of the brakes. One of these forces is the force of the spring 100, which attempts to raise the stem 95. The other of these forces is the pressure of the liquid in the braking system which is communicated through the tube 91 into the housing 90 and thence to the bellows 92, and which attempts to compress the bellows 92 and, therefore, move the stem 95 downwardly. It will further be apparent that the relation between these two forces may be controlled through the manually operated hand lever 104 which controls the amount of normal compression with the spring 100.

It will be apparent that with this construction the handle 104 may be turned so as to compress the spring 100 to such an extent as to prevent the pressure built up in the tubing 18 from overcoming the pressure of the spring sufficiently to permit the stem 95 to move downwardly and, contacting with the end of the stem 74, tend to move the valve 73 to open position and thereby limit the suction which may be applied to the cylinder 25. On the other hand, it will be apparent that by suitably controlling the compression of the spring 100 through the handle 104 a condition may be provided which will permit sufficient downward movement of the stem 95 upon the presence of a predetermined pressure in the cylinder 13 and tubing 18 to tend to overcome the force of the spring 77 and open the valve 73.

The effect of the movement tendency of the stem on the valve 73 will, of course, be modified by the pressure of the spring 77 surrounding the stem 74 of the valve 73. In other words, as the pressure of the spring 77 tending to hold the valve 73 closed is increased with increased travel of the pedal 16, the pressure which must necessarily be exerted by the stem 95 as a result of the pressure of the liquid in the hydraulic system, must necessarily be correspondingly increased to render it capable of overcoming the force of the spring 77 and open the valve 73. Thus two variable elements are present which tend to modify the opening tendencies of the valve 73 during normal operation of the device, and the effect of one of these variable may be further varied by manual operation of the lever arm 104.

The one of these variable elements tends to increase the available suction pressure in the system from a predetermined minimum suction pressure at non-operating conditions, and the other of these variable elements tends to oppose such increase in suction pressure, the effectiveness of such opposition being under the control of the operator through manipulation of the lever arm 104.

It will thus be seen that it is possible by proper positioning of the handle 104 to so regulate the compression of the spring 100 that upon the presence of a predetermined pressure on the fluid in the cylinder 13 and tubing 18, the amount of suction which may be applied to the braking system may be effectively limited for any particular amount of pedal tread, and by this means the driver of the vehicle may manually predetermine the maximum amount of braking effort that he may thereafter cause to be applied to the vehicle. It is of course understood that the handle 104 is placed at a point convenient to the driving position of the operator of the vehicle.

Formal changes may be made in the specific embodiment of the invention described without departing from the spirit and substance of the broad invention, the scope of which is commensurate with the appended claims.

What I claim is:

1. In combination with a hydraulic braking system, a booster mechanism operatively connected to said system, means including a valve for limiting the amount of force applicable by said booster mechanism to said system, and means affected by the hydraulic pressure in said system for moving said valve.

2. In combination with a hydraulic braking system, a vacuum booster mechanism operatively connected to said system, means for controlling the application of said booster mechanism, a valve for limiting the degree of suction applicable to said booster mechanism, and means responsive to the hydraulic pressure in said system for opening said valve.

3. In combination with a hydraulic braking system, a vacuum booster mechanism operatively connected to said system, means for controlling the application of said booster mechanism, a valve for limiting the degree of suction applicable to said booster mechanism, spring means constantly urging said valve towards closed position, and means responsive to the hydraulic pressure in said system for opening said valve.

4. In combination with a hydraulic braking system, a vacuum booster mechanism operatively connected to said system, means for controlling the application of said booster mechanism, a valve for limiting the degree of suction applicable to said booster mechanism, means responsive to the hydraulic pressure in said system for opening said valve, and means for modifying the action of said means in response to said pressure.

5. In combination with a hydraulic braking system, a vacuum booster mechanism operatively connected to said system, means for controlling the application of said booster mechanism, a valve for limiting degree of vacuum applicable to said booster mechanism, spring means normally urging said valve to closed position, means for controlling the action of said spring, and means responsive to the hydraulic pressure in said system for limiting the degree of vacuum applicable to said booster mechanism independently of the normal action of said spring.

6. In combination with a hydraulic braking system, a vacuum booster mechanism operatively connected to said system, means for controlling the application of said booster mechanism, a valve operatively connected in said booster mechanism and urged by the vacuum therein towards open position, a spring resisting opening movement of said valve, and means responsive to the hydraulic pressure in said system for rendering said spring inoperative.

7. In combination with a hydraulic braking system including a pedal, a vacuum booster mechanism operatively connected to said system, means for controlling the application of said booster mechanism, a valve operatively connected in said booster mechanism and urged by the vacuum therein towards open position, a spring resisting opening movement of said valve, means for varying the action of said spring in accordance with the position of said pedal in its path of travel, and means responsive to the hydraulic pressure in said system for rendering said spring inoperative.

8. In combination with a hydraulic braking system, a vacuum booster mechanism operatively connected to said system, means for controlling the application of said booster mechanism, a valve operatively connected in said booster mechanism and urged by the vacuum therein towards open position, a spring resisting opening movement of said valve, means responsive to the hydraulic pressure in said system for rendering said spring inoperative, and manually controllable means for varying the action of the last mentioned means.

9. In combination with a hydraulic braking system, a vacuum booster mechanism operatively connected to said system, means for controlling the application of said booster mechanism, a valve operatively connected in said booster mechanism and urged by the vacuum therein towards open position, a spring resisting opening movement of said valve, and means responsive to the hydraulic pressure in said system for rendering said spring inoperative, the last mentioned means comprising a movable wall exposed to the hydraulic pressure in said system, and spring means resisting the movement of said wall in response to said pressure.

10. In combination with a hydraulic braking system, a vacuum booster mechanism operatively connected to said system, means for controlling the application of said booster mechanism, a valve connected with said booster mechanism for controlling the degree of suction applicable to said booster mechanism, spring means constantly urging said valve to closed position, a movable wall exposed to the hydraulic pressure in said system, a spring resisting movement of said wall in response to said pressure, manually adjustable means for controlling the said resistance of said spring, and means extending between said valve and said wall whereby said valve may be opened upon movement of said wall in response to said pressure.

11. In combination with a hydraulic braking system, a booster mechanism operatively connected to said system, means including a movable valve for limiting the amount of force applicable to said system by said booster mechanism, means normally urging said valve towards one limit of its movable positions, and means sensitive to the pressure in said braking system for modifying the action of the second mentioned means.

12. In combination with a hydraulic braking system, a booster mechanism operatively connected to said system, means including a movable valve for limiting the amount of force applicable to said system by said booster mechanism, a spring normally urging said valve towards one limit of its movable positions, and means sensitive to the pressure in said braking system for modifying the action of said spring.

13. In combination with a hydraulic braking system, a pressure operated booster system connected therewith, a valve mechanism in said booster system for controlling the degree of force applied thereby to said braking system, and means movable in response to variations of pressure in said braking system co-operating with said valve mechanism for modifying the movement thereof.

14. In combination with a hydraulic braking system, a pressure operated booster system connected therewith, a valve mechanism in said booster system sensitive to the pressure therein for controlling the degree of force applied thereby to said braking system, and means movable in response to variations of pressure in said braking system co-operating with said valve mechanism for modifying the sensitiveness of said valve mechanism to said pressure in said booster system.

SAMUEL F. ARBUCKLE.